United States Patent
Kosuth et al.

(10) Patent No.: US 10,989,169 B1
(45) Date of Patent: Apr. 27, 2021

(54) SYSTEM AND METHOD FOR CONTROLLING A WIND FARM

(71) Applicant: General Electric Company, Schenectady, NY (US)

(72) Inventors: Charles Joseph Kosuth, Albany, NY (US); Patrick Hammel Hart, Ballston Lake, NY (US); Alina Fatima Moosvi, Ballston Spa, NY (US); Enno Ubben, Steinfurt (DE); Christoph Schulten, Salzbergen (DE); Alev Akbulut, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/684,771

(22) Filed: Nov. 15, 2019

(51) Int. Cl.
*F03D 7/02* (2006.01)
*F03D 9/25* (2016.01)
*H02J 3/38* (2006.01)

(52) U.S. Cl.
CPC .............. *F03D 7/028* (2013.01); *F03D 9/257* (2017.02); *H02J 3/386* (2013.01)

(58) Field of Classification Search
CPC ........... F03D 7/028; F03D 9/257; H02J 3/386
See application file for complete search history.

(56) References Cited

U.S. PATENT DOCUMENTS

| | | | |
|---|---|---|---|
| 9,026,258 B2 | 5/2015 | Stapelfeldt | |
| 9,407,186 B2 | 8/2016 | Babazadeh et al. | |
| 9,556,852 B2 | 1/2017 | Babazadeh et al. | |
| 9,709,037 B2 | 7/2017 | Sagi et al. | |
| 1,002,711 A1 | 7/2018 | Ubben et al. | |
| 1,053,911 A1 | 1/2020 | Jessen et al. | |
| 2016/0049792 A1* | 2/2016 | Burra | H02J 13/0086 307/52 |
| 2018/0355848 A1* | 12/2018 | Wei | G05B 19/042 |
| 2019/0003456 A1 | 1/2019 | Garcia et al. | |
| 2019/0162166 A1* | 5/2019 | Jessen | F03D 7/028 |
| 2020/0200145 A1* | 6/2020 | Zinck | F03D 7/046 |

FOREIGN PATENT DOCUMENTS

| | | |
|---|---|---|
| EP | 2326835 B1 | 1/2011 |
| EP | 2921698 A1 | 9/2015 |
| WO | WO2017118460 A1 | 7/2017 |

\* cited by examiner

*Primary Examiner* — Tulsidas C Patel
*Assistant Examiner* — Joseph Ortega
(74) *Attorney, Agent, or Firm* — Dority & Manning, P.A.

(57) ABSTRACT

A system and method are provided for controlling a wind farm. Accordingly, a demand signal is received from the electrical grid. The farm-level controller also receives a plurality of capability metrics from each wind turbines, which include, at least, a steady-state power availability, a transient power availability and a responsive capability of each wind turbine. The farm-level controller determines a power production capability profile for each wind turbine and determines the availability of each wind turbine to meet at least a portion of the demand signal based on the power production capability profiles. The farm-level controller also determines which portion of the demand signal to be satisfied by each wind turbine based on the availability and the power production capability for each wind turbine.

18 Claims, 8 Drawing Sheets

SYSTEM AND METHOD FOR CONTROLLING A WIND FARM

FIELD

The present disclosure relates in general to wind farms, and more particularly to systems and methods for controlling wind farms based on a plurality of capability metrics of a plurality of wind turbines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

These wind turbine generators and wind farms are typically designed to deliver power to the electrical grid. Generally, wind turbines are optimized to provide steady-state power in response to a relatively constant wind. Optimally, this power is delivered to an electrical grid which is also stable. Traditionally, wind turbines are not particularly well-suited to aid the electrical grid in responding to transient conditions, such as, a sudden failure of generation, line fault or connection of a large load. However, as more power generated by wind turbines is interfaced through the utility system, it would be desirable for wind turbines to also contribute to the electrical grid's response to the transient conditions in order to stabilize the power system.

In order to respond to transient conditions, it may be desirable to utilize transient energy which may be available in the wind turbines, and by extension the wind farm. However, different environmental and/or mechanical conditions may exist at individual wind turbines within the wind farm. As a result of these differences, the power production capabilities of the various turbines may differ from turbine to turbine. As such, it may be desirable to tailor the demands placed on each wind turbine in responding to the transient conditions.

Thus, the art is continuously seeking new and improved systems to control the wind farm and tailor the demands placed on any individual wind turbine. Accordingly, the present disclosure is directed to systems and methods for controlling a wind turbine so as to establish power production commands for the individual wind turbines based on the capabilities of the individual turbines.

BRIEF DESCRIPTION

Aspects and advantages of the invention will be set forth in part in the following description, or may be obvious from the description, or may be learned through practice of the invention.

In one aspect, the present disclosure is directed to a method for controlling a wind farm connected to an electrical grid. The wind farm may have a plurality of wind turbines. The method may include determining, via a farm-level controller of the wind farm, a demand signal from the electrical grid. The method may include receiving, with the farm-level controller, a plurality of capability metrics from each of the plurality of wind turbines. The plurality of capability metrics may include at least a steady-state power availability, a transient power characteristic, and/or a responsive capability of each wind turbine. The method may also include determining, with the farm-level controller, a power production capability profile for each of the plurality of wind turbines by analyzing the plurality of capability metrics for each of the plurality of wind turbines. The method may include determining, with the farm-level controller, the ability of each of the plurality of wind turbines to meet at least a portion of the demand signal based on the power production capability profile. The method may further include determining, with the farm-level controller, which portion of the demand signal may be satisfied by each of the plurality of wind turbines based on the availability and the power production capability profile for each of the plurality of wind turbines. The method may include generating, with the farm-level controller, a power production command for each of the plurality of wind turbines. Additionally, the method may include transmitting the power production command to the plurality of wind turbines so as to control a power output of each of the plurality of wind turbines.

In an embodiment, the method may also include receiving, with the farm-level controller, data indicative of an environmental condition acting upon the wind farm. The method may include receiving, with the farm-level controller, data indicative of an operational condition of the electrical grid. The method may also include determining, with the farm-level controller, a desired wind-farm operating state based on the environmental condition and the operational condition of the electrical grid. Additionally, the method may include determining, with the farm-level controller, a weighting factor for each of the plurality of capability metrics received from each the plurality of wind turbines based on the desired wind farm operating state. Determining the power production capability profile for each wind turbine may also include applying the weighting factor to the received plurality of capability metrics.

In a further embodiment, the method may include filtering, with the farm-level controller, at least one capability metric of the plurality of capably metrics for at least one wind-farm operating state so as to preclude consideration of the at least one capability metric during non-applicable operating states of the wind farm.

In an embodiment, determining the availability of each of the plurality of wind turbines to meet at least the portion of the demand signal may further include determining, with the farm-level controller, a capability metric limit for each of the plurality of capability metrics from each of the plurality of wind turbines. The method may also include verifying, with the farm-level controller, that the power production commands complies with each of the corresponding capability metric limits In an additional embodiment, determining which portion of the demand signal to be satisfied by each of the plurality wind turbines may also include determining, with the farm-level controller, an anticipated portion of the demand signal to be satisfied by the steady-state power availability for each of the plurality wind turbines. The method may include determining, with the farm-level controller, an anticipated portion of the demand signal to be satisfied by the transient power characteristic for each of the plurality of wind turbines. Further, the method may include determining, with the farm-level controller, a remaining portion of the demand signal to be satisfied by a change in an operating state of each of the plurality wind turbines.

In a further embodiment, the change in the operating state may be based on a rise time capability for each of the plurality wind turbines.

In yet a further embodiment, determining the power production capability profile for each of the plurality of wind turbines may also include simultaneously considering the plurality of capability metrics from each of the plurality of wind turbines.

In an embodiment, the transient power characteristic may be based at least on a transient power availability and a transient energy availability for each of the plurality of wind turbines.

In an additional embodiment, the transient energy availability may be a kinetic energy of a rotor of each wind turbine of the plurality of wind turbines.

In an embodiment, the transient power characteristic may also be based on an energy discharge efficiency for each of the plurality of wind turbines.

In an embodiment, the method may also include receiving, with a turbine controller, the transmitted power command for a respective wind turbine of the plurality of wind turbines. The method may include filtering, with the turbine controller, the received power command based on an internal prioritization, wherein the received power command defines a required power production for the wind turbine. The method may further include determining, with the turbine controller, a portion of the required power production to be satisfied by each of a plurality of wind turbine capabilities. The plurality of wind turbine capabilities include, at least, the steady-state power availability, the transient power characteristic, and the responsive capability of the wind turbine. The method may also include changing at least one wind turbine operating state so as to satisfy the required power production.

In another aspect, the present disclosure is directed to a system for controlling a wind farm. The system may include a plurality of wind turbines operably coupled to electrical grid. The system may also include a farm-level controller communicatively coupled to the plurality wind turbines and to the electrical grid. The farm-level controller may include at least one processor configured to perform a plurality of operations. The plurality of operations may include receiving, with the farm-level controller, a demand signal from the electrical grid. The operations may include receiving, with the farm-level controller, a plurality of capability metrics from each of the plurality of wind turbines. The plurality of capability metrics may include at least a steady-state power availability, a transient power characteristic, and a responsive capability for each wind turbine. Additionally, the plurality of operations may include determining, with the farm-level controller, a power production capability profile for each of the plurality of wind turbines by analyzing the plurality of capability metrics for each of the plurality of wind turbines. The plurality of operations may include determining, with the farm-level controller, the availability of each of the plurality of wind turbines to meet at least a portion of the demand signal based on the power production capability profile. The plurality of operations may include determining, with the farm-level controller, which portion of the demand signal to be satisfied by each of the plurality of wind turbines based on the availability and the power production capability profile for each of the plurality of wind turbines. The plurality of operations may further include generating, with the farm-level controller, a power production command for each of the plurality wind turbines. The plurality of operations may further include transmitting the power production command to the plurality of wind turbine so as to control a power output of each of the plurality of wind turbines. It should be understood that the system may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
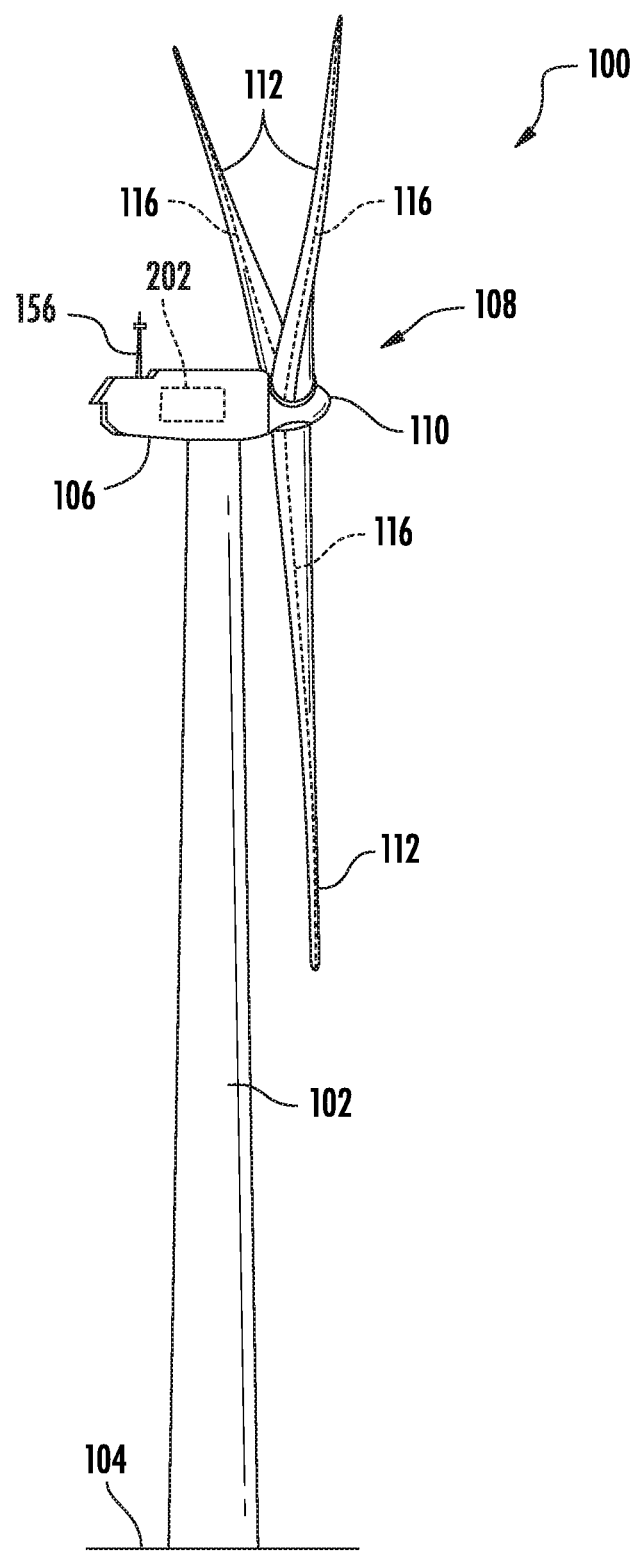
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind farm connected to an electrical grid. In particular, the present disclosure may include a system and method which may facilitate tailoring the power production of the various wind turbines of the wind farm in order to account for varying environmental and/or mechanical conditions throughout the wind farm. Specifically, the present disclosure may include receiving a demand signal from the electrical grid. The farm-level controller may then determine how much of the demand signal may be met by the steady-state power production of the wind farm. The farm-level controller may then determine how much of the remaining demand signal may be satisfied through an available transient power and energy. The amount of the demand signal which remains after portions are satisfied by the steady-state power and the transient power and/or energy may necessitate a required response from at least one turbine of the wind farm.

In order to meet the demand signal, the farm-level controller may also receive a plurality of capability metrics from each of the wind turbines. The plurality of capability metrics may include data indicative of at least a steady-state power availability, a transient power characteristic, and/or a responsiveness capability for each wind turbine. Based on the inputs received, the farm-level controller may determine a power production capability profile for each of the wind turbines by analyzing the plurality of capability metrics for each wind turbine. The farm-level controller may then determine the availability of each of the wind turbines to meet at least a portion of the demand signal based on these power production capability profiles. Based on the availability and the power production capability profile, the farm-level controller may then determine which portions of the demand signal are to be satisfied by each wind turbine. The farm-level controller may then generate and transmit a power production command for each of the wind turbines so as to control a power output of each of the wind turbines.

It should be appreciated that tailoring the production commands for each wind turbine of the wind farm may permit the more efficient operation of the wind farm. For example, the power production capability profile for a first turbine may indicate that the turbine is able to supply a large quantity of transient power to the electrical grid without slowing the rotor to an unacceptable degree. In contrast, the power production profile for a second turbine may indicate that any attempt to harvest transient energy from the second turbine may result in a slowing of the rotor to such a degree that the steady-state power production for the second turbine is negatively affected. In such a scenario, the farm-level controller may direct that transient energy be harvested from the first turbine in addition to the steady-state power, while only steady-state power is to be produced by the second turbine. As such, the overall power production of the wind farm may remain stable through a transient grid condition.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a turbine controller 202 (FIG. 3) centralized within the nacelle 106. However, in other embodiments, the turbine controller 202 may be located within any other component of the wind turbine 100 or at a location outside the wind turbine. Further, the turbine controller 202 may be communicatively coupled to any number of the components of the wind turbine 100 in order to control the components. As such, the turbine controller 202 may include a computer or other suitable processing unit. Thus, in several embodiments, the turbine controller 202 may include suitable computer-readable instructions that, when implemented, configure the turbine controller 202 to perform various different functions, such as receiving, transmitting and/or executing wind turbine control signals.

Figure 2:
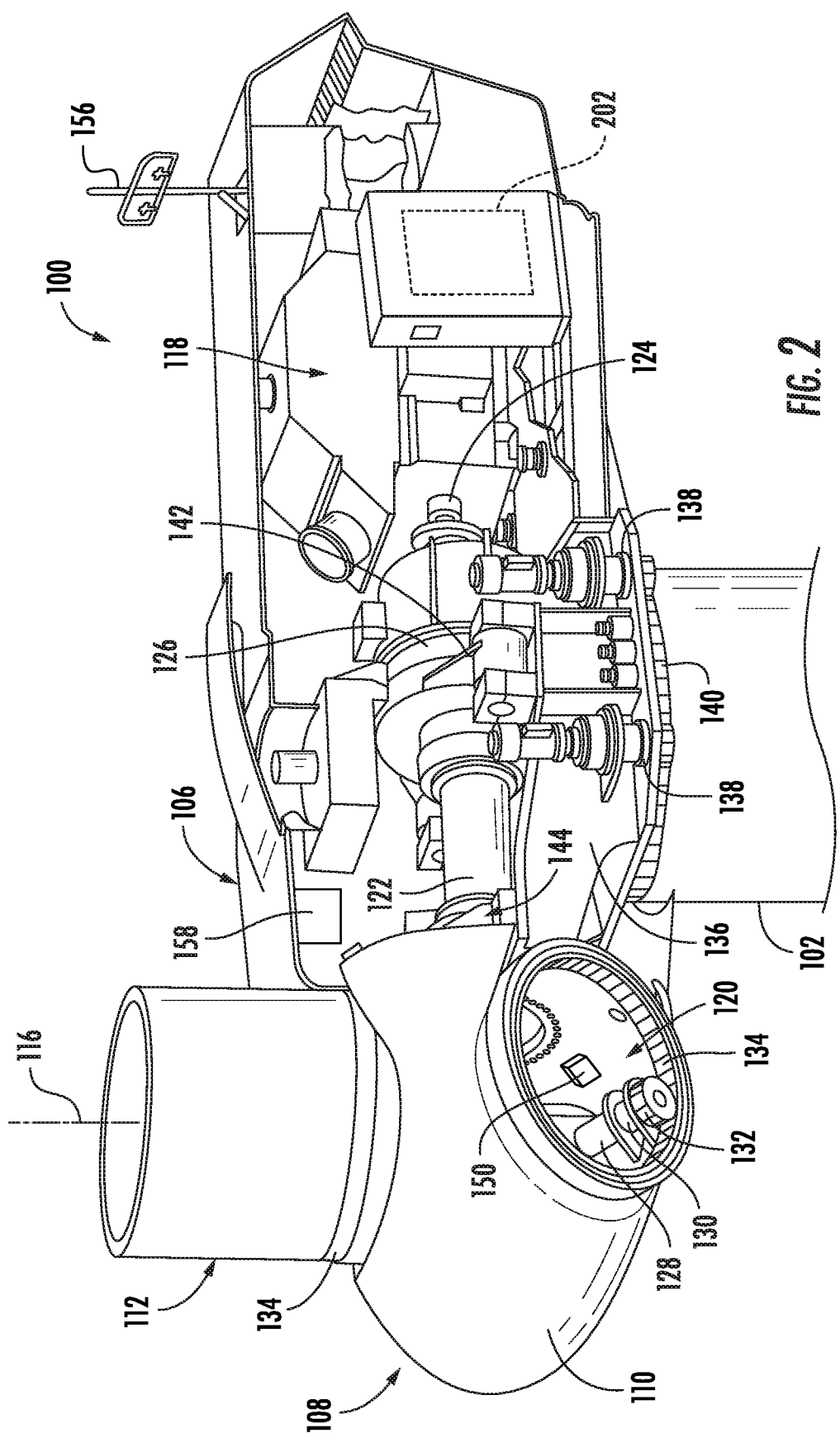
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the turbine controller 202. Further, each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the turbine controller 202, with each yaw drive mechanism(s) 138 being configured to change the angle of the nacelle 106 relative to the wind (e.g., by engaging a yaw bearing 140 of the wind turbine 100).

The rotation of each rotor blade 112 about its pitch axis 116 by its respective pitch control mechanism 120 may establish a pitch angle for each of the rotor blades 112. In an embodiment, the pitch angle may be an angular deviation from a zero-pitch location.

Still referring to FIG. 2, one or more sensors 156, 158, 160 may be provided on the wind turbine 100 to monitor the performance of the wind turbine 100 and/or environmental conditions affecting the wind turbine 100. It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the turbine controller 202 to determine the condition of the wind turbine 100.

Figure 3:
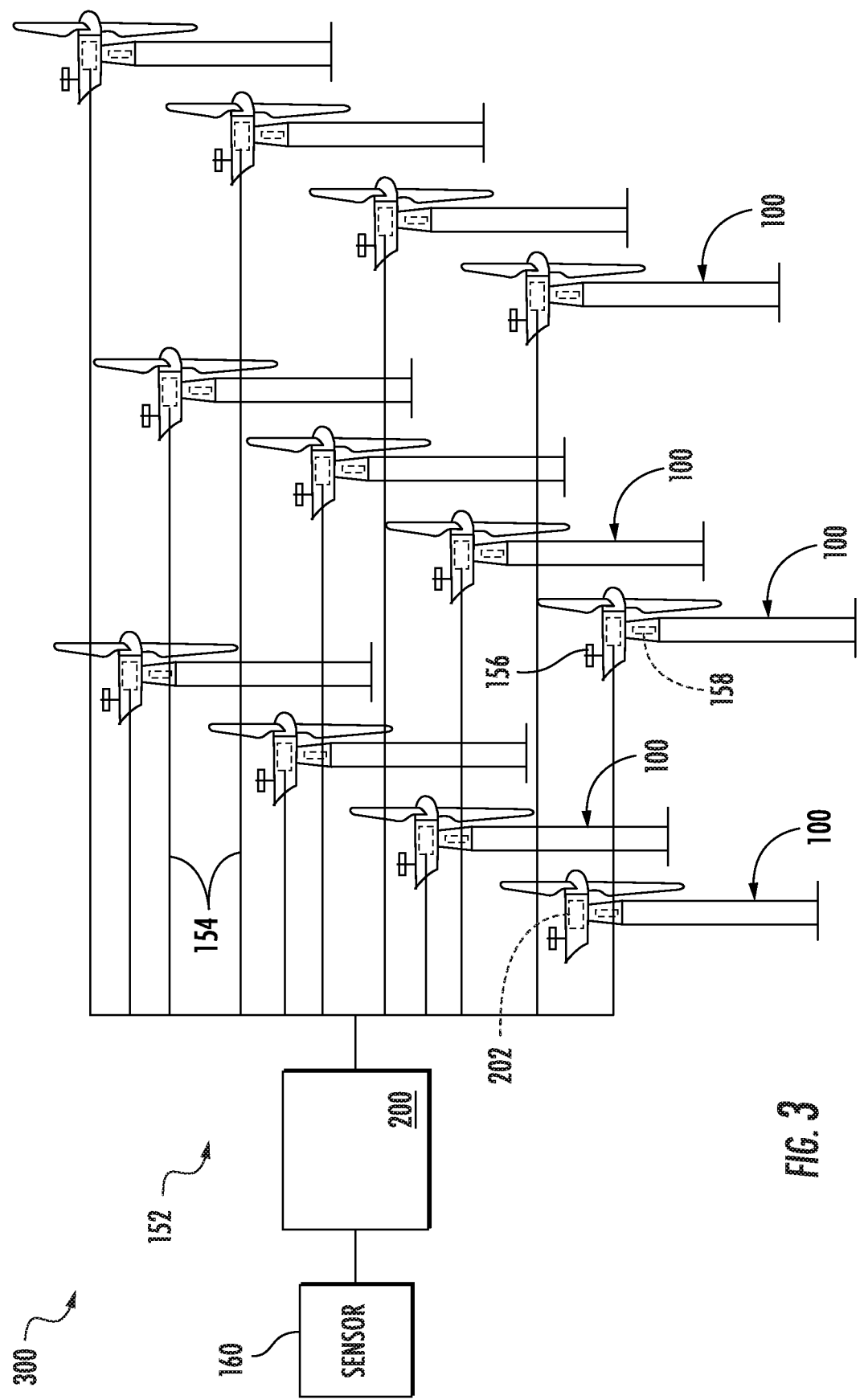
FIG. 3 illustrates a schematic diagram of one embodiment of a wind farm having a plurality of wind turbines according to the present disclosure.

Referring now to FIG. 3, a schematic view of a wind farm 152 controlled according to the system and method of the present disclosure is illustrated. As shown, the wind from 152 may include a plurality of the wind turbines 100 described herein and a farm-level controller 200. For example, as shown in the illustrated embodiment, the wind farm 152 may include twelve wind turbines 100. However, in other embodiments, the wind farm 152 may include any other number of wind turbines 100, such as less than twelve wind turbines 100 or greater than twelve wind turbines 100. In one embodiment, the turbine controller(s) 202 of the turbine(s) 100 may be communicatively coupled to the farm-level controller 200 through a wired connection, such as by connecting the turbine controller(s) 202 through suitable communicative links 154 (e.g., a suitable cable). Alternatively, the turbine controller(s) 202 may be communicatively coupled to the farm-level controller 200 through a wireless connection, such as by using any suitable wireless communications protocol known in the art. In addition, the farm-level controller 200 may be generally configured similar to the turbine controller 202 for each of the individual wind turbines 100 within the wind farm 152.

In several embodiments, the wind turbines 100 of the wind farm 152 may include a plurality of sensors for monitoring various operational data of the wind turbine(s) 100 and/or one or more when parameters of the wind farm 152. For example, as shown, each of the wind turbines 100 includes an environmental sensor 156 configured for gathering data indicative of at least one environmental condition. The environmental sensor 156 may be operably coupled to the farm-level controller 200 and to the turbine controller 202. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind speed, wind direction, wind shear, wind gust, wind veer, atmospheric pressure, and/or temperature. In at least one embodiment, the environmental sensor(s) 156 may be mounted to the nacelle 106 at a location downwind of the rotor 108. The environmental sensor(s) 156 may, in alternative embodiments, be coupled to, or integrated with, the rotor 108. It should be appreciated that the environmental sensor(s) 156 may include a network of sensors and may be positioned away from the turbine(s) 100. It should be appreciated that environmental conditions may vary significantly across a wind farm 152. Thus, the environmental sensor(s) 156 may allow for the local environmental conditions, such as local wind speed, at each wind turbine 100 to be monitored individually by the respective turbine controllers 202 and collectively by the farm-level controller 200.

Referring still to FIG. 3, in an embodiment, the farm-level controller 200 may also be operably coupled to at least one grid sensor 160. The grid sensor(s) 160 may be operably coupled to an electrical power grid. The grid sensor(s) 160 may be configured to detect data indicative of a transient grid condition. The data indicative of the transient grid condition may be interpreted by the farm-level controller 200 as a demand signal from the electrical grid.

In addition to the environmental sensor(s) 156, the wind turbine 100 may also include one or more turbine condition sensors 158. The turbine condition sensor 158 may, for example, be configured to monitor electrical properties of the output of the generator 118 of the wind turbine(s) 100, such as current sensors, voltage sensors temperature sensors, or power sensors that monitor power output directly based on current and voltage measurements.

In at least one embodiment, the turbine condition sensor(s) 158 may include any other sensors that may be utilized to monitor the operating state of the wind turbine(s) 100. More specifically, the turbine condition sensor(s) 158 may be a rotational speed sensor operably coupled to the turbine controller(s) 202. The turbine condition sensor(s) 158 may be directed at the rotor shaft 122 of the wind turbine 100. The turbine condition sensor(s) 158 may gather data indicative of the rotational speed of the rotor shaft 122, and thus the rotor 108. The turbine condition sensor(s) 158 may, in an embodiment, be an analog tachometer, a D.C. tachometer, an A.C. tachometer, a digital tachometer, a contact tachometer a non-contact tachometer, or a time and frequency tachometer.

In an additional embodiment, the turbine condition sensor(s) 158 may be a pitch sensor. As such, the turbine controller(s) 202 may receive a pitch setpoint indication for the rotor 108 of the wind turbine 100 via turbine condition sensor(s) 158 operably coupled to the pitch control mechanism 120. The turbine controller(s) 202 may consider the pitch setpoint indication in light of the environmental condition so as to determine whether the pitch of the rotor 108 is an operating state which may be changed to satisfy a required power production. It should also be further appreciated that the wind turbines 100 in the wind farm 152 may include any other suitable sensor known in the art for measuring and/or monitoring when parameters and/or wind turbine operational data.

Figure 4:
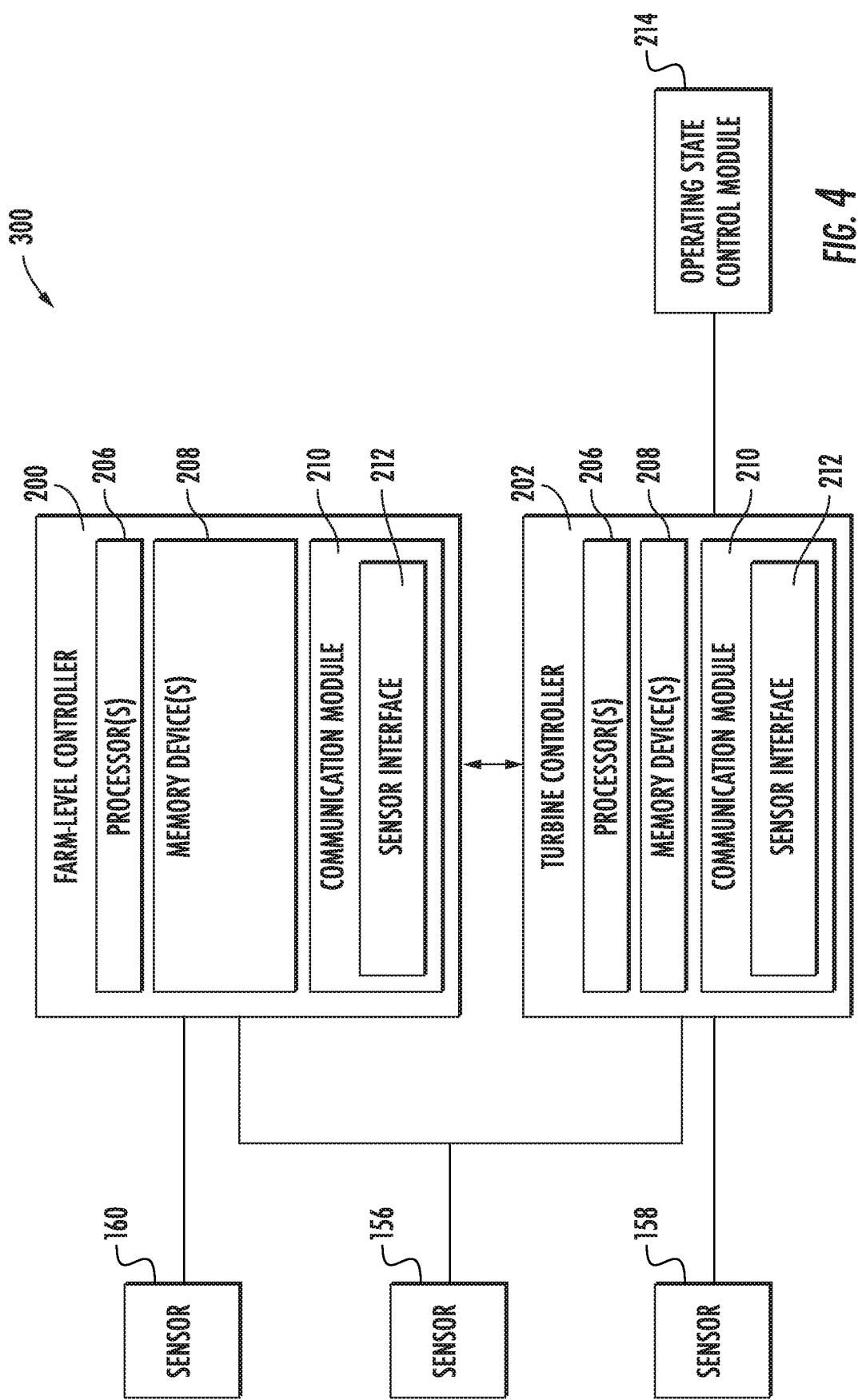
FIG. 4 illustrates a schematic diagram of one embodiment of a farm controller and a turbine controller for use with the wind farm as shown in FIG. 2.

Referring now to FIGS. 4-7, schematic diagrams of multiple embodiments of a system 300 for controlling the wind farm 152 according to the present disclosure are presented. As shown particularly in FIG. 4, a schematic diagram of one embodiment of suitable components that may be included within the farm-level controller 200 and the turbine controller 202 is illustrated. For example, as shown, the controllers 200, 202 may include one or more processor(s) 206 and associated memory device(s) 208 configured to perform a variety of computer-implemented functions (e.g., performing the methods, steps, calculations and the like and storing relevant data as disclosed herein). Additionally, the controllers 200, 202 may also include a communications module 210 to facilitate communications between the controllers 200, 202 and the various components of the turbine(s) 100. Further, the communications module 210 may include a sensor interface 212 (e.g., one or more analog-to-digital converters) to permit signals transmitted from one or more sensors 156, 158, 160 to be converted into signals that can be understood and processed by the processors 206. It should be appreciated that the sensors 156, 158, 160 may be communicatively coupled to the communications module 210 using any suitable means. For example, as shown in FIG. 4, the sensors 156, 158, 160 are coupled to the sensor interface 212 via a wired connection. However, in other embodiments, the sensors 156, 158, 160 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 202 to perform various functions including, but not limited to, detecting an approach of the current condition to a current-dependent limit and affecting a speed of the generator 118 so as to alter a rotor-stator balance of the generator 118 such that the current-dependent limit is not exceeded and the wind turbine 100 can operate at a rated power, as described herein, as well as various other suitable computer-implemented functions.

Figure 5:
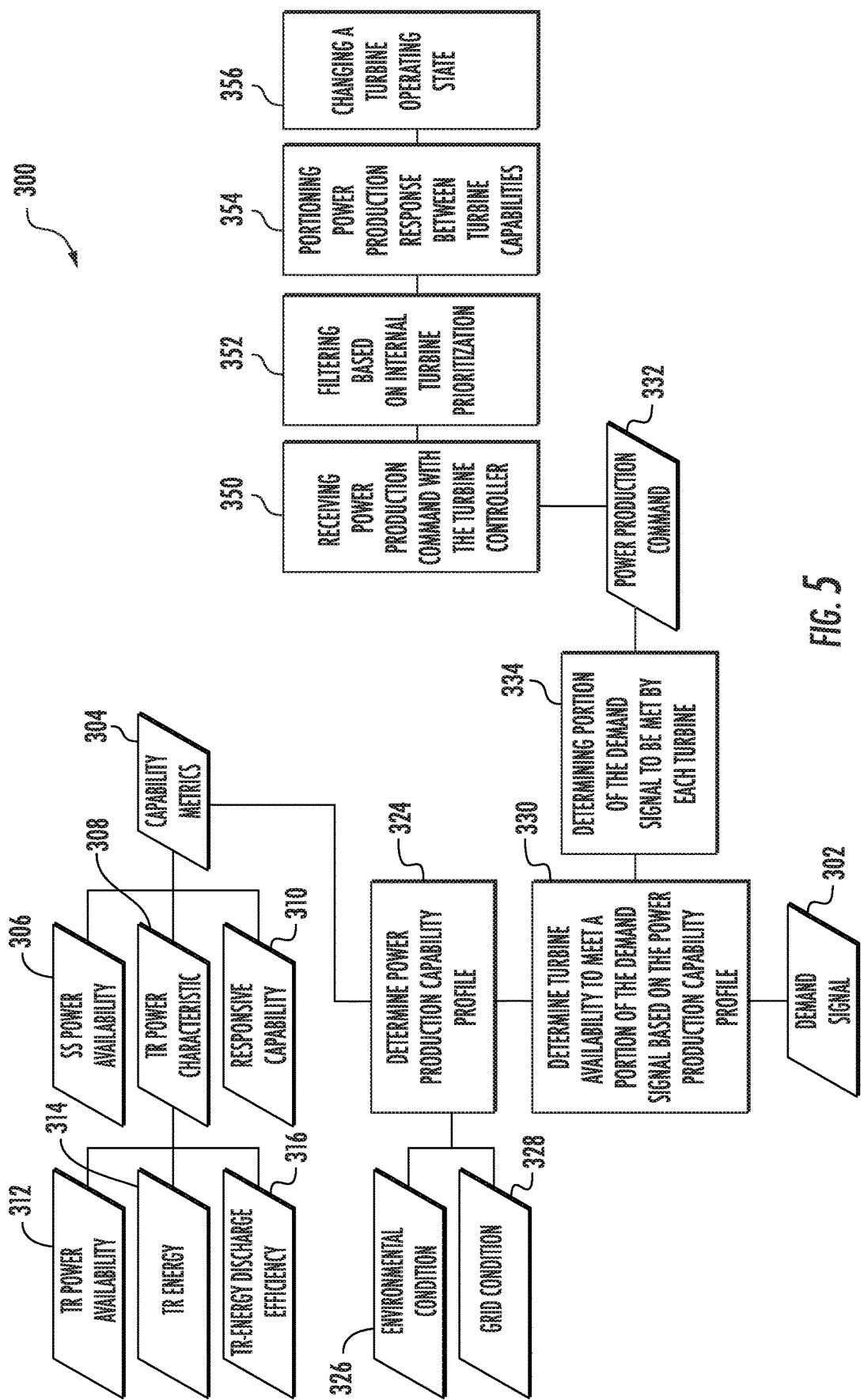
FIG. 5 illustrates a schematic diagram of one embodiment of a control logic of a system for operating a wind farm according to the present disclosure.
Figure 6:
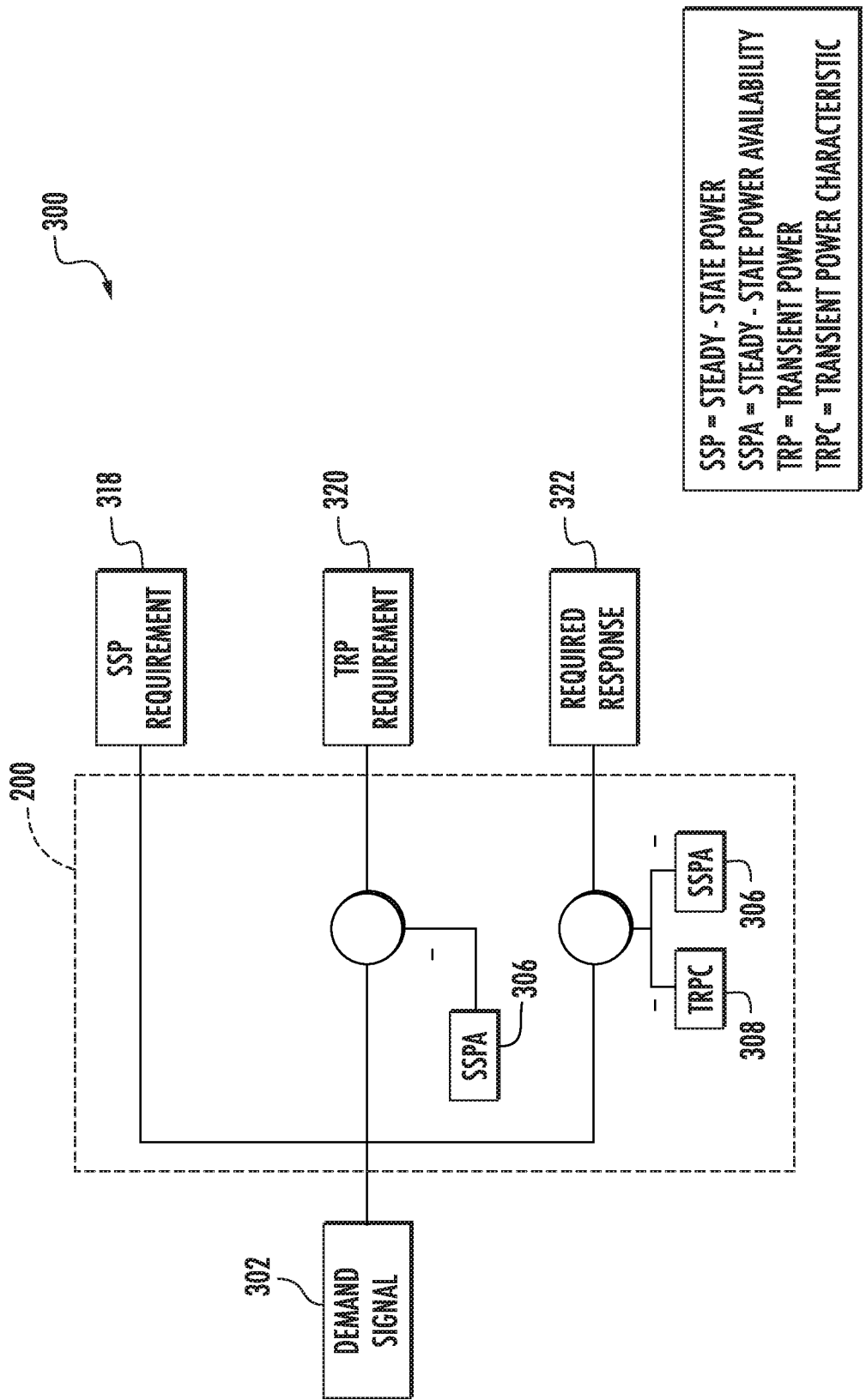
FIG. 6 illustrates a schematic diagram of a portion of the control logic of FIG. 5 particularly illustrating an embodiment of the control logic for interpreting a demand signal from the electrical grid according to the present disclosure.

Referring particularly to FIG. 5, in an embodiment, the farm-level controller 200 of the system 300 may be configured to receive a demand signal 302 from the electrical grid. In certain embodiments, the demand signal 302 may include a requirement from the electrical grid that the wind farm 152 provide a specified power output in response to a transient condition of the electrical grid.

In an embodiment, as shown in FIG. 5, the farm-level controller 200 may also be configured to receive a plurality of capability metrics 304 from each of the plurality of wind turbines 100. To that end, the turbine controller(s) 202 may communicate to the farm-level controller 200 a plurality of capability metrics 304, which include at least a steady-state power availability 306, a transient power characteristic 308, and a responsive capability 310 for each wind turbine 100 of the wind farm 152.

In an embodiment, the wind farm 152 may have a steady-state power availability 306. This steady-state power availability 306 may reflect the active power production for the wind farm 152 for the currently prevailing environmental conditions. Each wind turbine 100 of the wind farm 152 may also have a steady-state power availability 306 (reflected in FIG. 7 by the subscript "(i)"). The steady-state power availability 306 for each wind turbine 100 may indicate the ability of the wind turbine 100 to continue providing an indicated power production for the currently prevailing environmental conditions. In other words, the steady-state power availability 306 may reflect a relatively unchanging power production over a specified time interval. It should be appreciated that the steady-state power availability 306 for the various wind turbines 100 may differ from wind turbine to wind turbine. This variation may be due to differences in the environmental conditions at various locations across the wind farm and/or differences in the operating states of the wind turbines 100.

Figure 7:
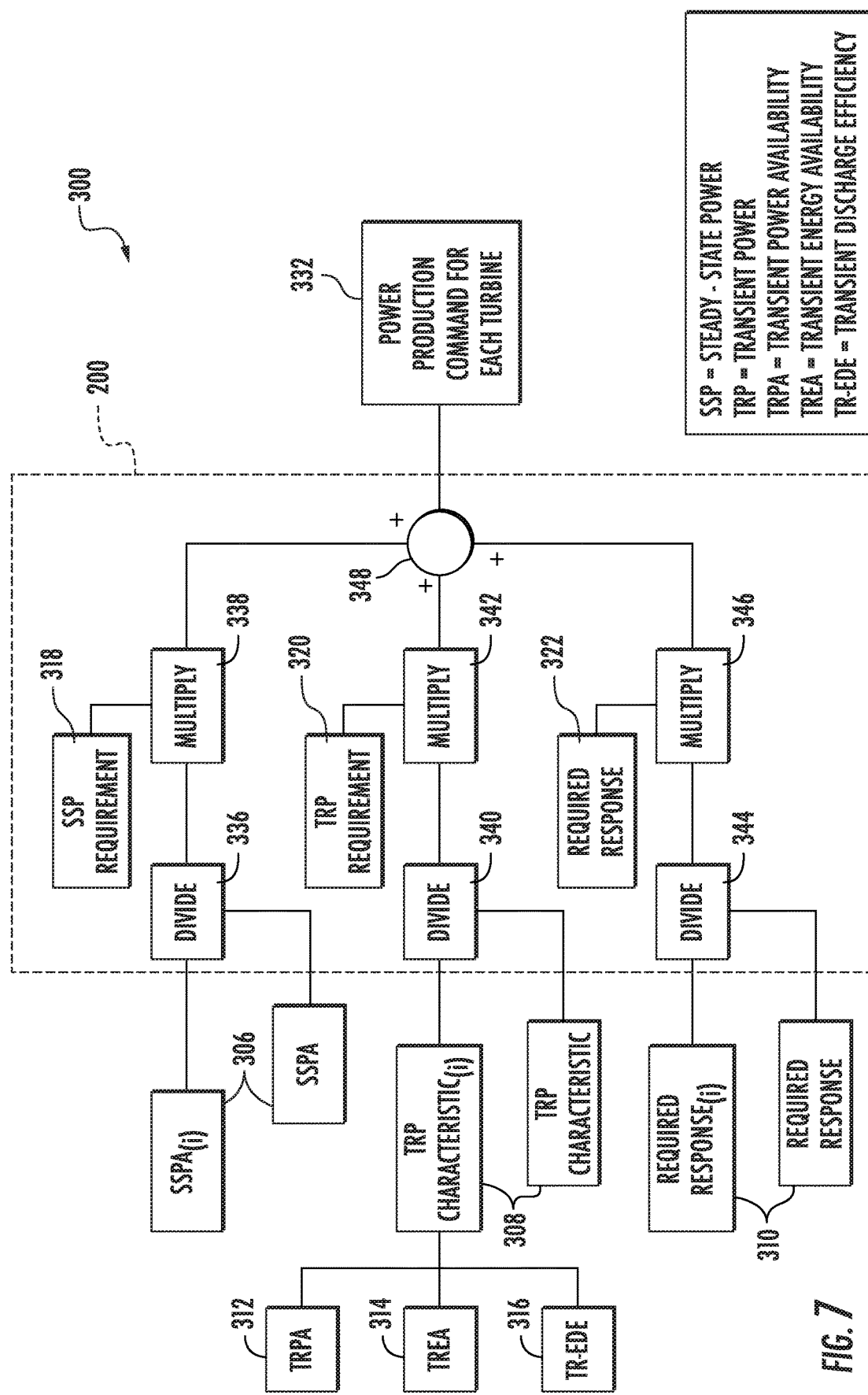
FIG. 7 illustrates a schematic diagram of a portion of the control logic of FIG. 5 particularly illustrating an embodiment of the control logic for determining a portion of the demand signal to be met by each turbine according to the present disclosure.

As particularly depicted in FIGS. 5 and 7, the transient power characteristic 308 may reflect and ability of the wind turbine(s) 100 to respond to a transient condition in the electrical grid. The transient power characteristic 308 may, in at least one embodiment, be based at least on a transient power availability 312 and a transient energy availability 314 for each of the plurality of wind turbines 100.

In at least one embodiment, the transient energy availability 314 may be an indication of the kinetic energy of the rotor 108 of the wind turbine(s) 100. In such an embodiment, the rotor 108 serves as a flywheel storing rotational energy until required for the driving of the generator 118. The rotational inertia of the rotor 108 may permit the rotor 108 to continue revolving and driving the generator 118 for a calculable period following a decrease in the effective wind velocity acting upon the wind turbine(s) 100. This may allow the wind turbine(s) 100 to continue producing a steady-state power during periods of fluctuating wind speeds. Additionally, the kinetic energy of the rotor 108 may be harvested in order to increase the rotational speed of the rotor shaft 122 in excess of that which would otherwise be achievable in direct response to the currently prevailing environmental conditions. In an embodiment, this may be accomplished by increasing the torque of the generator 118. So long as the increased torque does not exceed the rotational inertia of the rotor 108, the increase in torque may result in a higher rotational speed of the high-speed shaft 124 and thus a higher power output. However, the harvesting of the kinetic energy may also serve to slow the rotor. If the increase in torque is too great or is applied for too great a duration, the rotor 108 may slow to such a degree that the wind turbine(s) 100 become incapable of producing a required steady-state power. As such, increasing power production utilizing the stored kinetic energy may be a transitory process limited by the amount of kinetic energy stored in the rotor 108 and the degree to which the torque of the generator 118 is increased.

In an embodiment, the transient power availability 312 may be an indication of the accessibility of the kinetic energy of the rotor 108 for the power production by the generator 118. The transient power availability 312 may be a hardware limit affecting the rate at which kinetic energy may be harvested from the rotor 108 and converted to electrical power. For example, recognizing that harvesting the kinetic energy of the rotor 108 to produce electrical power may result in an increase in the rotational speed of the high-speed shaft 124, a maximally acceptable rotational speed of the high-speed shaft 124 may serve to limit the rate at which the kinetic energy of the rotor may be discharged. In other words, in an exemplary embodiment, the kinetic energy of rotor 108 may be sufficient to be converted into a certain amount of electrical power, but the hardware of the wind turbine(s) 100 may limit this production to a fraction of that amount per time interval. In such an exemplary embodiment, the transient power availability 312 may limit the transient power characteristic 308 to fraction per time interval.

It should be appreciated that in at least one embodiment, the transient power availability 312 may be greater than the transient energy availability 314. In other words, the rate at which the kinetic energy of the rotor 108 may be converted into electrical power may exceed the amount of kinetic energy stored in the rotor 108 and converting the kinetic energy to electrical power may rapidly decelerate the rotor 108. In such an embodiment, the transient power characteristic 308 may be limited by the transient energy availability 314 rather than the transient power availability 312 as discussed previously.

Referring still to FIGS. 5 and 7, in an embodiment, the transient power characteristic 308 may also include a transient energy discharge efficiency 316. The transient energy discharge efficiency 316 may be a measure of efficiency with which the kinetic energy of the rotor 108 is converted into electrical power by the generator 118 and transmitted to the electrical grid. The transient energy discharge efficiency 316 may, for example, be affected by the physical characteristics of the generator 118, the transformer, the converter, cabling, the gearbox 126, and/or any other component of the wind turbine(s) 100.

In an embodiment, the responsive capability 310 may reflect and ability of the wind turbine(s) 100 to respond to a power production command 332 from the farm-level controller 200. The ability of the wind turbine(s) 100 to respond to a power production command 332 may correspond to a turbine operating state, a mechanical limit, an environmental condition, or a combination thereof. For example, in an embodiment wherein the wind turbine(s) 100 is operating in a de-powered state due to a wind velocity exceeding a limit for the wind turbine(s) 100, the wind turbine(s) 100 may lack the ability to increase the steady-state power production of the generator 118, as doing so may pose an unacceptable risk to the wind turbine(s) 100. Similarly, a wind speed may be insufficient to drive an increase in the rotational speed of the rotor 108 of the wind turbine(s) 100. As such, the response of the wind turbine(s) 100 to a power production commands may be curtailed. In an alternative embodiment, a mechanical condition of the wind turbine(s), such as a fault in the pitch control mechanism 120, may preclude an optimal response to the power command. Alternatively, the responsive capability 310 may indicate that the wind turbine(s) 100 is readily able to positively respond the power production command and is thus able to increase the power output of the generator 118. It should be appreciated that turbine(s) 100 with higher responsiveness may be prioritized to support changes in power setpoints.

Referring again to FIGS. 4-7, in an embodiment, such as particularly depicted in FIG. 6, the farm-level controller 200 of the system 300 may be configured to determine the amount of the demand signal 302 which may be satisfied by the steady-state power availability 306 of the wind farm 152. This determination may establish the steady-state power requirement 318 of the demand signal 302. The farm-level controller 200 may subtract the steady-state power availability 306 from the demand signal 302 in order to derive the transient power requirement 320 of the demand signal 302. Additionally, the farm-level controller 200 may subtract both the steady-state power availability 306 and the transient power characteristic 308 in order to derive the required response of the wind farm 152. In other words, the system 300 may seek to meet the demand signal 302 first using the available steady-state power. The system 300 may then seek to meet whatever portion of the demand signal 302 remains in excess of the steady-state power availability 306 with the transient power. Finally, the system 300 may seek to meet the remaining portion, if any, of the demand signal 302 by generating a response within the wind farm 152. The response may, for example, include increasing the steady-state power production of the wind turbine(s) 100.

As shown at 324 of FIG. 5, the farm-level controller 200 of the system 300 may be configured to determine a power production capability profile for each of the wind turbine(s) 100. The farm-level controller 200 may analyze the plurality of capability metrics 304 for each of the wind turbines 100 of the wind farm 152. The power production capability profiles may indicate an initial capability of the wind turbine(s) 100 to respond to the demand signal 302. It should be appreciated that the power production capability profiles may indicate that certain wind turbines 100 may be better situated to respond to the steady-state power requirement 318, while other wind turbines 100 may be better situated to respond to the transient power requirement 320.

In at least one embodiment, the farm-level controller 200 of the system 300 may be configured to determine a power production capability profile for each of the wind turbine(s) 100 by simultaneously considering the plurality of capability metrics 304. Considering multiple capability metrics 304 simultaneously allows for nonlinear distribution methodologies, which may allow available transient power to be utilized more efficiently. In turn, this may yield a longer discharge duration for the transient power characteristic 308 in other words, by considering multiple capability metrics 304 simultaneously, the farm-level controller 200 may avoid overtaxing a first wind turbine 100 while at the same time under utilizing a second wind turbine 100. Thus, the overall efficiency of the response of the wind farm 152 to a demand signal 302 may be increased.

Referring still to 324 of FIG. 5, in an embodiment, the farm-level controller 200 of the system 300 may be configured to apply a weighting factor to the received plurality of capability metrics 304 in order to determine the power production capability profile for each wind turbine 100. In order to determine the weighting factor, the farm-level controller 200 may be configured to receive data indicative of an environmental condition 326 acting upon the wind farm 152 via the environmental sensor(s) 156. The environmental condition 326 may be an average environmental condition acting on the entirety of the wind farm 152 or, alternatively, may be selected by the farm-level controller 200 from a plurality of environmental conditions acting at different locations across the wind farm 152. The farm-level controller 200 may also be configured to receive data indicative of a grid condition 328 of the electrical grid via the grid sensor(s) 160. The grid condition 328 may reflect the operational condition of the electrical grid. For example, the grid sensor(s) 160 may detect a grid condition indicating a relatively stable electrical grid, a grid experiencing a high-load condition, a grid experiencing frequent, minor transient events, and/or a grid experiencing a relatively significant transient condition, such as an unexpected shutdown of a connected power plant.

In an embodiment, the farm-level controller 200 may determine a desired wind-farm operating state based on the environmental condition 326 and the grid condition 328. For example, based on the currently prevailing environmental condition 326 and grid condition 328, the farm-level controller 200 may determine that the wind farm 152 should be optimized for steady-state power production at the expense of storing kinetic, or inertial, energy throughout the wind farm 152. Alternatively, the farm-level controller 200 may, elect to prioritize inertial energy storage so as to position the wind farm 152 to be better able to respond to transient conditions in the electrical grid. In such an embodiment, the speed of the rotors 108 of the wind turbine(s) 100 may be permitted to increase in response to the environmental condition 326 while the torque of the generator 118 may be decreased resulting in a storage of kinetic energy in the rotors 108. It should be appreciated that the wind-farm operating state may not be a binary choice between prioritizing steady-state power and the storing of kinetic energy, but rather, may be a combination thereof.

In an embodiment, the system 300 may direct the establishment of the desired wind-farm operating state via the farm-level controller 200 applying the weighting factor to the plurality of capability metrics 304. The weighting factors may, thus alter the power production capability profile for each wind turbine 100. For example, in an embodiment wherein it may be desirable to increase the stored kinetic energy of the rotor(s) 108, the farm-level controller 200 may apply a weighting factor to the transient power characteristic 308 which serves to effectively reduce the amount of transient power which may be available to meet the transient power requirement 320. Thus, because the computed amount of the transient power characteristic 308 may be less than the amount of transient power which may actually be available in the wind farm 152, the wind farm 152 may store additional kinetic energy in the wind turbine(s) 100.

In at least one embodiment, the farm-level controller 200 may filter at least one capability metric of the plurality of capability metrics 304 for at least one wind-farm operating state. Filtering the capability metrics 304 may preclude consideration of the at least one capability metric during non-applicable operating states of the wind farm 152. By filtering the plurality of capability metrics 304, the farm-level controller 200 may prevent interference between capability metrics during certain operating states wherein one of the capability metrics may not be relevant. For example, in a scenario wherein the grid conditions are relatively stable, the farm-level controller 200 may filter the transient power characteristic 308 from the capability metrics 304. In such a situation, the farm-level controller 200 may not consider the transient power characteristic 308 as a capability of the wind turbine(s) 100 to meet the demand signal 302. However, should the grid sensor 160 detect an under-frequency event that may require an inertial response from the wind farm 152, the farm-level controller 200 may stop filtering the transient power characteristic 308 so that the transient power characteristic 308 may be utilized to satisfy a portion of the demand signal 302.

As shown at 330 of FIG. 5, the farm-level controller 200 of the system 300 may be configured to determine the availability of each of the wind turbines 100 to meet, at least a portion, of the demand signal 302 based on the power production capability profiles. For example, the power production capability profile for one of the wind turbines 100 may indicate that the wind turbine 100 does not have the capability to satisfy any portion of the transient power requirement 320. This inability may be due to conditions at the wind turbine 100 and/or the weighting discussed previously.

In at least one embodiment, the farm-level controller 200 may also determine a capability metric limit for each of the plurality of capability metrics 304 from the wind turbine(s) 100. The farm-level controller 200 may then verify that any power production commands 332 to the wind turbine(s) 100 comply with each of the corresponding capability metric limits. For example, in an embodiment, the hardware configuration of the wind turbine(s) 100 may limit the power production of the wind turbine(s) 100 to a maximal output. In such an embodiment, the farm-level controller 200 may verify that meeting the required response 322 will not drive the wind turbine(s) 100 to exceed the maximal output limit. Alternatively, in an embodiment, the wind turbine(s) 100 may require the rotor 108 to have a certain inertia, or speed, in order to effectively respond to the prevailing environmental conditions 326. In such an embodiment, the farm-level controller 200 may verify that meeting the required response 322 will not slow the rotor 108 to such a degree as to violate the minimum speed limit for the rotor 108.

As shown at 334 of FIG. 5, the farm-level controller 200 of the system 300 may be configured to determining which portion of the demand signal 302 is to be satisfied by each of the plurality of wind turbines 100 based on the availability and the power production capability profile for each of the plurality of wind turbines 100. This determination may include determining an anticipated portion of the demand signal 302 to be satisfied by the steady-state power availability 306 for each of the plurality of wind turbines 100. As particularly illustrated in FIG. 7, the farm-level controller 200 may divide, at 336, the steady-state power availability 306 for a first wind turbine 100 by the steady-state power availability 306 for the wind farm 152. The farm-level controller 200 may then multiply, at 338, the resultant value by the steady-state power requirement 318 in order to yield the portion of the steady-state power requirement 318 to be satisfied by the first wind turbine 100. The farm-level controller 200 may, in at least one embodiment, perform the same calculation simultaneously for the remainder of the wind turbines 100 of the wind farm 152.

Referring still to FIG. 7, the farm-level controller 200 may determine the portion of the demand signal 302 to be met by the transient power characteristic 308 of each wind turbine 100 of the wind farm 152. In order to make this determination, the farm-level controller 200 may divide, at 340, the transient power characteristic 308 for the first wind turbine 100 by the transient power characteristic 308 for the wind farm. The farm-level controller 200 may then multiply, at 342, the resultant value by the transient power requirement 320 in order to yield the portion of the transient power requirement 320 to be satisfied by the first wind turbine 100. The farm-level controller 200 may, in at least one embodiment, perform the same calculation simultaneously for the remainder of the wind turbines 100 of the wind farm 152.

Referring still to FIG. 7, the farm-level controller 200 may determine the portion of the demand signal to be met by the response capability 310 of each wind turbine 100 of the wind farm 152. In order to make this determination, farm-level controller 200 may divide, at 344, a value representing the response capability 310, such as rise time capability, for the first wind turbine 100 by a value representing the response capability 310 for the wind farm. The farm-level controller 200 may then multiply, at 346, the resultant value by the required response 322 in order to yield the portion of the required response 322 to be satisfied by the first wind turbine 100. The farm-level controller 200 may, in at least one embodiment, perform the same calculation simultaneously for the remainder of the wind turbines 100 of the wind farm 152.

Referring generally to FIGS. 4-7, in an embodiment, the farm-level controller 200 of the system 300 may be configured to combine, at 348, the various portions of the demand signal 302 to be satisfied by a single wind turbine 100 and generate a power production command 332 for each wind turbine 100 of the wind farm 152. The single, combined power production command 332 for each wind turbine 100 may define a required power production for the wind turbine 100. The power production command 332 may be based on the portions of the demand signal to be satisfied by the particular wind turbine 100, which in turn may be based on the availability of the particular wind turbine 100 and the capability of the particular wind turbine 100 to provide the required power production. However, the power production command 332 transmitted to the wind turbine(s) 100 may not specify which portions of the required power production may be satisfied by at least the steady-state power availability 306, the transient power characteristic 308, and the responsive capability 310 for the wind turbine(s) 100. As such, it should be appreciated that, utilizing a single combined power command 332 may permit a turbine-level regulation of the power production based on an internal prioritization of the wind turbine(s) 100. It should be further appreciated that the generation of the power production command 332 may occur cyclically at a rate of less than once every 100 milliseconds, for example at a rate of once every 40 milliseconds or less.

As shown at 350 of FIG. 5, in an embodiment, the turbine controller(s) 202 of the system 300 may be configured to receive the transmitted power command 332 for a respective wind turbine 100 of the wind farm 152. As shown at 352, in an embodiment, the turbine controller(s) 202 may filter the received power command 332, which defines the required power production for the wind turbine 100, based on an internal prioritization for the wind turbine(s) 100.

As shown at 354, in an embodiment, the turbine controller(s) 202 may determine a portion of the required power production to be satisfied by each of a plurality of wind turbine capabilities. The plurality of wind turbine capabilities include, at least, the steady-state power availability 306, the transient power characteristic 308, and the responsive capability 310 of the wind turbine 100. Based on this determination, the turbine controller(s) 202 may select an operating condition of the wind turbine 100 for adjustment. In an embodiment, the turbine controller(s) 202 may balance the various inputs received from the turbine condition sensor(s) 158 concerning the operation of the wind turbine(s) 100 and the environmental condition 326 in order to select an optimal operating parameter for adjustment. It should be appreciated, however, that the turbine controller(s) 202 may, in consideration of the various inputs, determine that the wind turbine(s) 100 is unable to satisfy the power production requirement and may report thus to the farm-level controller 200.

As shown at 356 of FIG. 5, the turbine controller(s) 202 may also be configured to change at least one wind turbine operating state so as to satisfy the required power production. In an embodiment, the turbine controller(s) 202 may transmit a command signal to the operating state control module 214 so as to affect a change in at least one aspect of the wind turbine operating state.

In an exemplary embodiment, the turbine controller(s) 202 may select the pitch of the rotor blades 112 as the operating parameter to be adjusted so as to affect the shaft speed of the generator 118 and thereby increase (or decrease) the power production of the wind turbine(s) 100. To that end, the turbine controller 204 may generate and transmit a pitch setpoint command to the pitch controller 150 of the pitch control mechanism 120. The pitch setpoint command may instruct the pitch control mechanism 120 to pitch at least one of the rotor blades 112 of the rotor(s) 108 of the wind turbine 100 so as to accelerate the rotor(s) 108 of the wind turbine(s) 100 for the determined environmental condition 226. An acceleration of the rotor(s) 108 may result in the acceleration of the rotor shaft 122, the high-speed shaft 124, and the generator 118, in turn. It should be appreciated that such an adjustment may not be commanded if the wind turbine 100 is operating in a de-powered state based on a wind velocity exceeding a limit.

In an alternative embodiment, the turbine controller(s) 202 may select the torque of the generator as the operating parameter to be adjusted in order to increase the torque and harvest a portion of the transient energy 314 of the rotor(s) 108 by converting the transient energy 314 into an electrical power production of the generator 118. To that end, the turbine controller(s) 202 may generate and transmit a torque command to the converter instructing the converter to increase the torque of the generator 118, thereby slowing the rotational speed of the rotor(s) 108.

Figure 8:
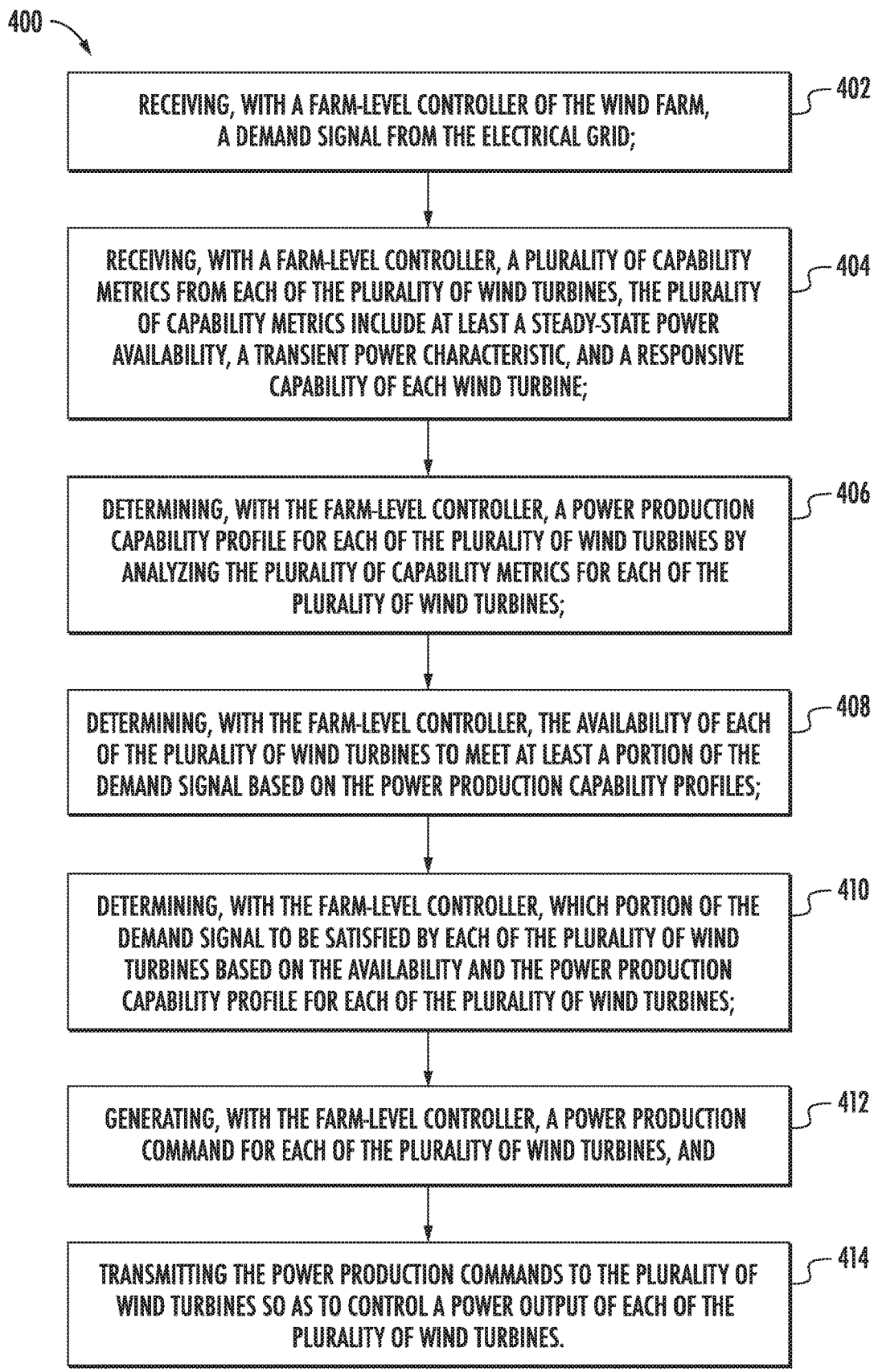
FIG. 8 illustrates a flow diagram of one embodiment of a method for controlling a wind farm connected to an electrical grid according to the present disclosure.

Referring now to FIG. 8, a flow diagram of one embodiment of a method 400 for controlling a wind farm is illustrated. The method 400 may be implemented using, for instance, the system 300 of the present disclosure discussed above with references to FIGS. 1-7. FIG. 8 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at (402), the method 400 may include receiving, with a farm-level controller of the wind farm, a demand signal from the electrical grid. As shown at (404), the method 400 may include receiving, with the farm-level controller, a plurality of capability metrics from each of the plurality of wind turbines. The plurality of capability metrics include at least a steady-state power availability, a transient power characteristic, and a responsive capability for each wind turbine. As shown at (406), the method 400 may include determining, with the farm-level controller, a power production capability profile for each of the plurality of wind turbines by analyzing the plurality of capability metrics for each of the plurality of wind turbines. As shown at (408), the method 400 may include determining, with the farm-level controller, the availability of each of the plurality of wind turbines to meet at least a portion of the demand signal based on the power production capability profiles. As shown at (410), the method 400 may include determining, with the farm-level controller, which portion of the demand signal to be satisfied by each of the plurality of wind turbines based on the availability and the power production capability profile for each of the plurality of wind turbines. Additionally, as shown at (412), the method 400 may include generating, with the farm-level controller, a power production commands for each of the plurality of wind turbines. As shown at (414), the method 400 may include transmitting the power production commands to the plurality of wind turbines so as to control a power output of each of the plurality wind turbines.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind farm connected to an electrical grid, the wind farm having a plurality of wind turbines, the method comprising receiving, with a farm-level controller of the wind farm, a demand signal from the electrical grid; receiving, with the farm-level controller, a plurality of capability metrics from each of the plurality of wind turbines, the plurality of capability metrics include at least a steady-state power availability, a transient power availability and a responsive capability of each wind turbine; determining, with the farm-level controller, a power production capability profile for each of the plurality of wind turbines by analyzing the plurality of capability metrics for each of the plurality of wind turbines; determining, with the farm-level controller, the availability of each of the plurality of wind turbines to meet at least a portion of the demand signal based on the power production capability profiles; determining, with the farm-level controller, which portion of the demand signal to be satisfied by each of the plurality of wind turbines based on the availability and the power production capability profile for each of the plurality of wind turbines; generating, with the farm-level controller, a power production command for each of the plurality of wind turbines; and transmitting the power production commands to the plurality of wind turbines so as to control a power output of each of the plurality of wind turbines.

Clause 2. The method of any preceding clause, further comprising receiving, with the farm-level controller, data indicative of an environmental condition acting upon the wind farm; receiving, with the farm-level controller, data indicative of an operational condition of the electrical grid; determining, with the farm-level controller, a desired wind-farm operating state based on the environmental condition and the operational condition of the electrical grid; and determining, with the farm-level controller, a weighting factor for each of the plurality of capability metrics received from each of the plurality of wind turbines based on the desired wind farm operating state, wherein determining the power production capability profile for each wind turbine further comprises applying the weighting factor to the received plurality of capability metrics.

Clause 3. The method of any preceding clause, further comprising: filtering, with the farm-level controller, at least one capability metric of the plurality of capability metrics for at least one wind-farm operating state so as to preclude consideration of the at least one capability metric during non-applicable operating states of the wind farm.

Clause 4. The method of any preceding clause, wherein determining the availability of each of the plurality of wind turbines to meet at least the portion of the demand signal further comprises: determining, with the farm-level controller, a capability metric limit for each of the plurality of capability metrics from each of the plurality of wind turbines; and verifying, with the farm-level controller, that the power production command complies with each of the corresponding capability metric limits.

Clause 5. The method of any preceding clause, wherein determining which portion of the demand signal to be satisfied by each of the plurality of wind turbines further comprises: determining, with the farm-level controller, an anticipated portion of the demand signal to be satisfied by the steady-state power availability for each of the plurality of wind turbines; determining, with the farm-level controller, an anticipated portion of the demand signal to be satisfied by the transient power availability for each of the plurality of wind turbines; and determining, with the farm-level controller, a remaining portion of the demand signal to be satisfied by a change in an operating state of each of the plurality of wind turbines.

Clause 6. The method of any preceding clause, wherein the change in the operating state is based on a rise time capability for each of the plurality of wind turbines.

Clause 7. The method of any preceding clause, wherein determining the power production capability profile for each of the plurality of wind turbines further comprises simultaneously considering the plurality of capability metrics from each of the plurality of wind turbines.

Clause 8. The method of any preceding clause, wherein the transient power availability is based on a transient energy availability and an energy discharge efficiency for each of the plurality of wind turbines.

Clause 9. The method of any preceding clause, wherein the transient energy availability is a kinetic energy of a rotor of each wind turbine of the plurality of wind turbines.

Clause 10. The method of any preceding clause, further comprising: receiving, with a turbine controller, the transmitted power command for a respective wind turbine of the plurality of wind turbines; filtering, with the turbine controller, the received power command based on an internal prioritization, wherein the received power command defines a required power production for the wind turbine; determining, with the wind turbine controller, a portion of the required power production to be satisfied by each of a plurality of wind turbine capabilities, wherein the plurality of wind turbine capabilities include at least the steady-state power availability, the transient power availability, and the responsive capability of the wind turbine; and changing at least one wind turbine operating state so as to satisfy the required power production.

Clause 11. The method of any preceding clause, wherein generating the power production command for each of the plurality of wind turbines further comprises generating the power production command for each of the plurality of wind turbines at least every 40 ms.

Clause 12. A system for controlling a wind turbine farm, the system comprising: a plurality of wind turbines operably coupled to an electrical grid; and a farm-level controller communicatively coupled to the plurality of wind turbines and to the electrical grid, the farm-level controller comprising at least one processor configured to perform a plurality of operations, the plurality of operations comprising: receiving, with a farm-level controller of the wind farm, a demand signal from the electrical grid, receiving, with the farm-level controller, a plurality of capability metrics from each of the plurality of wind turbines, the plurality of capability metrics include at least a steady-state power availability, a transient power availability and a responsive capability of each wind turbine; determining, with the farm-level controller, a power production capability profile for each of the plurality of wind turbines by analyzing the plurality of capability metrics for each of the plurality of wind turbine; determining, with the farm-level controller, the availability of each of the plurality of wind turbines to meet at least a portion of the demand signal based on the power production capability profiles; determining, with the farm-level controller, which portion of the demand signal to be satisfied by each of the plurality of wind turbines based on the availability and the power production capability profile for each of the plurality of wind turbines; generating, with the farm-level controller, a power production command for each of the plurality of wind turbines; and transmitting the power production commands to the plurality of wind turbines so as to control a power output of each of the plurality of wind turbines.

Clause 13. The system of any preceding clause, wherein the system further comprises at least one environmental sensor and wherein the plurality of operations further comprises: receiving, with the farm-level controller, data indicative of an environmental condition acting upon the wind farm; receiving, with the farm-level controller, data indicative of an operational condition of the electrical grid; determining, with the farm-level controller, a desired wind-farm operating state based on the environmental condition and the operational condition of the electrical grid; and determining, with the farm-level controller, a weighting factor for each of the plurality of capability metrics received from each of the plurality of wind turbines based on the desired wind farm operating state, wherein determining the power production capability profile for each wind turbine further comprises applying the weighting factor to the received plurality of capability metrics.

Clause 14. The system of any preceding clause, wherein the plurality of operations further comprises: determining, with the farm-level controller, a capability metric limit for each of the plurality of capability metrics from each of the plurality of wind turbines; and verifying, with the farm-level controller, that the power production command complies with each of the corresponding capability metric limits.

Clause 15. The system of any preceding clause, wherein the plurality of operations further comprises: determining, with the farm-level controller, an anticipated portion of the demand signal to be satisfied by the steady-state power availability for each of the plurality of wind turbines; determining, with the farm-level controller, an anticipated portion of the demand signal to be satisfied by the transient power availability for each of the plurality of wind turbines; and determining, with the farm-level controller, a remaining portion of the demand signal to be satisfied by a change in an operating state of each of the plurality of wind turbines.

Clause 16. The system of any preceding clause, wherein the change in the operating state is based on a rise time capability for each of the plurality of wind turbines.

Clause 17. The system of any preceding clause claim 15, wherein the process of determining the power production capability profile for each of the plurality of wind turbines further comprises simultaneously considering the plurality of capability metrics from each of the plurality of wind turbines.

Clause 18. The system of any preceding clause, wherein the transient power availability is based on a transient energy availability and an energy discharge efficiency for each of the plurality of wind turbines.

Clause 19. The system of any preceding clause, wherein the transient energy availability is a kinetic energy of a rotor of each wind turbine of the plurality of wind turbines.

Clause 20. The system of any preceding clause 12, further comprising: a plurality of turbine controllers communicatively coupled to a corresponding wind turbine of the plurality of wind turbines, the turbine controller comprising at least one processor configured to perform a plurality of operations, the plurality of operations comprising: receiving, with a turbine controller, the transmitted power command for a respective wind turbine of the plurality of wind turbines; filtering, with the turbine controller, the received power command based on an internal prioritization, wherein the received power command defines a required power production for the wind turbine; determining, with the wind turbine controller, a portion of the required power production to be satisfied by each of a plurality of wind turbine capabilities, wherein the plurality of wind turbine capabilities include at least the steady-state power availability, the transient power availability, and the responsive capability of the wind turbine; and changing at least one wind turbine operating state so as to satisfy the required power production.

What is claimed is:

1. A method for controlling a wind farm connected to an electrical grid, the wind farm having a plurality of wind turbines, the method comprising:

receiving, with a farm-level controller of the wind farm, a demand signal from the electrical grid;

receiving, with the farm-level controller, a plurality of capability metrics from each of the plurality of wind turbines, the plurality of capability metrics include at least a steady-state power availability, a transient power characteristic, and a responsive capability of each wind turbine;

determining, with the farm-level controller, a power production capability profile for each of the plurality of wind turbines by analyzing the plurality of capability metrics for each of the plurality of wind turbines;

determining, with the farm-level controller, the availability of each of the plurality of wind turbines to meet at least a portion of the demand signal based on the power production capability profiles;

determining, with the farm-level controller, which portion of the demand signal to be satisfied by each of the plurality of wind turbines based on the availability and the power production capability profile for each of the plurality of wind turbines, the determination comprising:
  determining, with the farm-level controller, an anticipated portion of the demand signal to be satisfied by the steady-state power availability for each of the plurality of wind turbines;
  determining, with the farm-level controller, an anticipated portion of the demand signal to be satisfied by the transient power characteristic for each of the plurality of wind turbines, and
  determining, with the farm-level controller, a remaining portion of the demand signal to be satisfied by a change in an operating state of each of the plurality of wind turbines;
generating, with the farm-level controller, a power production command for each of the plurality of wind turbines; and
transmitting the power production commands to the plurality of wind turbines so as to control a power output of each of the plurality of wind turbines.

2. The method of claim 1, further comprising:
receiving, with the farm-level controller, data indicative of an environmental condition acting upon the wind farm;
receiving, with the farm-level controller, data indicative of an operational condition of the electrical grid;
determining, with the farm-level controller, a desired wind-farm operating state based on the environmental condition and the operational condition of the electrical grid; and
determining, with the farm-level controller, a weighting factor for each of the plurality of capability metrics received from each of the plurality of wind turbines based on the desired wind farm operating state, wherein determining the power production capability profile for each wind turbine further comprises applying the weighting factor to the received plurality of capability metrics.

3. The method of claim 2, further comprising:
filtering, with the farm-level controller, at least one capability metric of the plurality of capability metrics for at least one wind-farm operating state so as to preclude consideration of the at least one capability metric.

4. The method of claim 1, wherein determining the availability of each of the plurality of wind turbines to meet at least the portion of the demand signal further comprises:
determining, with the farm-level controller, a capability metric limit for each of the plurality of capability metrics from each of the plurality of wind turbines; and
verifying, with the farm-level controller, that the power production command complies with each of the corresponding capability metric limits.

5. The method of claim 1, wherein the change in the operating state is based on a rise time capability for each of the plurality of wind turbines.

6. The method of claim 1, wherein determining the power production capability profile for each of the plurality of wind turbines further comprises simultaneously considering the plurality of capability metrics from each of the plurality of wind turbines.

7. The method of claim 6, wherein the transient power characteristic is based at least on a transient power availability and a transient energy availability for each of the plurality of wind turbines.

8. The method of claim 7, wherein the transient energy availability is an amount of kinetic energy of a rotor of each wind turbine of the plurality of wind turbines.

9. The method of claim 8, wherein the transient power characteristic further comprises a transient energy discharge efficiency for each of the plurality of wind turbines.

10. The method of claim 1, further comprising:
receiving, with a turbine controller, the transmitted power production command for a respective wind turbine of the plurality of wind turbines;
filtering, with the turbine controller, the received power production command based on an internal prioritization, wherein the received power command defines a required power production for the wind turbine;
determining, with the turbine controller, a portion of the required power production to be satisfied by each of a plurality of wind turbine capabilities, wherein the plurality of wind turbine capabilities include at least the steady-state power availability, the transient power characteristic, and the responsive capability of the wind turbine; and
changing at least one wind turbine operating state so as to satisfy the required power production.

11. A system for controlling a wind farm, the system comprising:
a plurality of wind turbines operably coupled to an electrical grid; and
a farm-level controller communicatively coupled to the plurality of wind turbines and to the electrical grid, the farm-level controller comprising at least one processor configured to perform a plurality of operations, the plurality of operations comprising:
  receiving, with a farm-level controller of the wind farm, a demand signal from the electrical grid;
  receiving, with the farm-level controller, a plurality of capability metrics from each of the plurality of wind turbines, the plurality of capability metrics include at least a steady-state power availability, a transient power characteristic, and a responsive capability of each wind turbine;
  determining, with the farm-level controller, a power production capability profile for each of the plurality of wind turbines by analyzing the plurality of capability metrics for each of the plurality of wind turbines;
  determining, with the farm-level controller, the availability of each of the plurality of wind turbines to meet at least a portion of the demand signal based on the power production capability profiles;
  determining, with the farm-level controller, which portion of the demand signal to be satisfied by each of the plurality of wind turbines based on the availability and the power production capability profile for each of the plurality of wind turbines, the determination comprising:
    determining an anticipated portion of the demand signal to be satisfied by the steady-state power availability for each of the plurality of wind turbines,
    determining an anticipated portion of the demand signal to be satisfied by the transient power characteristic for each of the plurality of wind turbines, and determining a remaining portion of the demand signal to be satisfied by a change in an operating state of each of the plurality of wind turbines;

generating, with the farm-level controller, a power production command for each of the plurality of wind turbines; and transmitting the power production commands to the plurality of wind turbines so as to control a power output of each of the plurality of wind turbines.

12. The system of claim 11, wherein the system further comprises at least one environmental sensor and wherein the plurality of operations further comprises:

receiving data indicative of an environmental condition acting upon the wind farm;

receiving data indicative of an operational condition of the electrical grid;

determining a desired wind-farm operating state based on the environmental condition and the operational condition of the electrical grid; and determining a weighting factor for each of the plurality of capability metrics received from each of the plurality of wind turbines based on the desired wind-farm operating state, wherein determining the power production capability profile for each wind turbine further comprises applying the weighting factor to the received plurality of capability metrics.

13. The system of claim 11, wherein the plurality of operations further comprises:

determining a capability metric limit for each of the plurality of capability metrics from each of the plurality of wind turbines; and verifying that the power production command complies with each of the corresponding capability metric limits.

14. The system of claim 11, wherein the change in the operating state is based on a rise time capability for each of the plurality of wind turbines.

15. The system of claim 11, wherein the process of determining the power production capability profile for each of the plurality of wind turbines further comprises simultaneously considering the plurality of capability metrics from each of the plurality of wind turbines.

16. The system of claim 15, wherein the transient power characteristic is based at least on a transient power availability and a transient energy availability for each of the plurality of wind turbines.

17. The system of claim 16, wherein the transient energy availability is an amount of kinetic energy of a rotor of each wind turbine of the plurality of wind turbines.

18. The system of claim 11, further comprising:

a plurality of turbine controllers communicatively coupled to a corresponding wind turbine of the plurality of wind turbines, the turbine controller comprising at least one processor configured to perform a plurality of operations, the plurality of operations comprising:

receiving, with a turbine controller of the plurality of turbine controllers, the transmitted power production command for a respective wind turbine of the plurality of wind turbines;

filtering, with the turbine controller, the received power production command based on an internal prioritization, wherein the received power production command defines a required power production for the wind turbine;

determining, with the wind turbine controller, a portion of the required power production to be satisfied by each of a plurality of wind turbine capabilities, wherein the plurality of wind turbine capabilities include at least the steady-state power availability, the transient power characteristic, and the responsive capability of the wind turbine; and changing at least one wind turbine operating state so as to satisfy the required power production.

* * * * *